United States Patent
Takatsuka

(10) Patent No.: US 9,199,687 B2
(45) Date of Patent: Dec. 1, 2015

(54) SADDLE-TYPE VEHICLE

(71) Applicant: HONDA MOTOR CO., LTD., Tokyo (JP)

(72) Inventor: Kazuhiro Takatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/315,758

(22) Filed: Jun. 26, 2014

(65) Prior Publication Data

US 2015/0042062 A1    Feb. 12, 2015

(30) Foreign Application Priority Data

Aug. 8, 2013  (JP) .................. 2013-165529

(51) Int. Cl.
*B62K 11/00* (2006.01)
*B62K 21/02* (2006.01)
*B62L 1/00* (2006.01)
*G01P 3/487* (2006.01)
*G01P 3/488* (2006.01)

(52) U.S. Cl.
CPC ............. *B62K 21/02* (2013.01); *B62K 11/00* (2013.01); *B62L 1/00* (2013.01); *G01P 3/487* (2013.01); *G01P 3/488* (2013.01); *B62K 2207/00* (2013.01)

(58) Field of Classification Search
CPC .. B62K 210/02; B62K 11/00; B62K 2207/00; B62L 1/00
USPC .................... 280/276, 279; 180/219
See application file for complete search history.

(56) References Cited

U.S. PATENT DOCUMENTS

| | | | | | |
|---|---|---|---|---|---|
| 4,895,284 | A | * | 1/1990 | Nogami et al. | 224/413 |
| 6,209,599 | B1 | * | 4/2001 | Richardson | 150/167 |
| 8,849,474 | B2 | * | 9/2014 | Yoneta et al. | 701/1 |
| 2006/0213713 | A1 | * | 9/2006 | Takenaka | 180/224 |
| 2006/0219455 | A1 | * | 10/2006 | Watanabe et al. | 180/219 |
| 2007/0188012 | A1 | * | 8/2007 | Hariu et al. | 303/3 |
| 2008/0105479 | A1 | * | 5/2008 | Nishiike et al. | 180/197 |
| 2009/0088298 | A1 | * | 4/2009 | Iwashita et al. | 477/175 |
| 2012/0022761 | A1 | * | 1/2012 | Matsuda | 701/87 |
| 2013/0041522 | A1 | * | 2/2013 | Mori et al. | 701/1 |
| 2014/0058627 | A1 | * | 2/2014 | Harazono et al. | 701/41 |
| 2014/0214300 | A1 | * | 7/2014 | Hasegawa | 701/79 |
| 2015/0076790 | A1 | * | 3/2015 | Sugimoto et al. | 280/283 |

FOREIGN PATENT DOCUMENTS

| JP | 8-133154 A | | 5/1996 |
|---|---|---|---|
| JP | 2012-063874 | * | 3/2012 |

* cited by examiner

*Primary Examiner* — Kevin Hurley
*Assistant Examiner* — Marlon Arce
(74) *Attorney, Agent, or Firm* — Westerman, Hattori, Daniels & Adrian, LLP

(57) ABSTRACT

A wheel speed sensor is provided between a front wheel and a front fork. The wheel speed sensor includes a sensor body to be supported by the front side of the front fork. A front fender includes a downward extending portion extending downward along the front side of the front fork. The downward extending portion covers the sensor body. As such, the influence of an arrangement of a sensor body on the design in a saddle-type vehicle provided with a wheel speed sensor between a front fork and a wheel is suppressed.

16 Claims, 6 Drawing Sheets

SADDLE-TYPE VEHICLE

CROSS-REFERENCE TO RELATED APPLICATIONS

The present application claims priority under 35 U.S.C. §119 to Japanese Patent Application No. 2013-165529, filed Aug. 8, 2013, the contents of which are incorporated herein, by reference, in their entirety.

TECHNICAL FIELD

The present invention relates to a saddle-type vehicle.

BACKGROUND OF THE INVENTION

In the related art, a configuration in which a wheel speed sensor is provided between a wheel and a front fork in order to measure a wheel speed of a motorcycle is known (for example, see JP-A-8-133154). The wheel speed sensor includes a sensor ring rotating integrally with the wheel, and a sensor body opposing a portion-to-be-detected of the sensor ring.

SUMMARY OF THE INVENTION

In the configuration of the related art described above, the sensor body is supported by the front fork on the inside thereof in the vehicle width direction and is arranged so as to enter the inside of the wheel, and opposes the portion-to-be-detected of the sensor ring from radially outside. In contrast, in recent years, an arrangement in which the sensor body is supported on the back side of the front fork and opposes the portion-to-be-detected of the sensor ring from the outside in the vehicle width direction is employed in many cases, so that ease of assembly and ease of maintenance are improved while suppressing a disturbance to the sensor body.

In contrast, a brake caliper is supported on the rear side of the front fork in many cases. The brake caliper is a component which constitutes part of design in the saddle-type vehicle, and, in order to improve the coolability is exposed to the outside in many cases. Therefore, a cover or the like is not provided on the rear side of the front fork, and hence the design may be disadvantageously influenced because of the exposure of the sensor body to the outside.

Accordingly, a saddle-type vehicle having a wheel speed sensor between a front fork and a wheel is provided which is prevented from being disadvantageously influenced in design by an arrangement of a sensor body.

According to a first aspect, a saddle-type vehicle includes: a front fork configured to rotatably support a wheel; a front fender configured to cover an upper portion of the wheel; a brake caliper configured to be supported on the back side of the front fork; and a wheel speed sensor provided between the wheel and the front fork, characterized in that the wheel speed sensor includes a sensor body supported in front of the front fork, the front fender includes a downward extending portion extending downward along the front side of the front fork, and the downward extending portion covers the sensor body.

The saddle-type vehicle includes general vehicles on which an operator rides by straddling a vehicle body, and includes not only motorcycles (including motorized two-wheeled vehicles and scooter-type vehicles), but also three-wheeled (in addition to vehicles with one front wheel and two rear wheels, vehicles with two front wheel and one rear wheel are included) or four-wheeled vehicles.

According to a second aspect, the sensor body is arranged above an axle of the wheel.

According to a third aspect, the front fork includes a mounting portion for the sensor body in the vicinity of the axle of the wheel.

According to a fourth aspect, the downward extending portion of the front fender extends downward until being overlapped with the axle of the wheel in the vertical direction.

According to a fifth aspect, the downward extending portion of the front fender includes a side wall portion configured to cover the sensor body from the outside and a front wall portion configured to cover the sensor body from the front side.

According to the first aspect, exposure of the sensor body to the outside is suppressed, so that the disadvantageous influence of the arrangement of the sensor body on the design may be suppressed. Since the brake caliper and the sensor body are arranged on the front and the rear of the front fork, respectively, works to be done at the time of assembly or maintenance of the sensor body and at the time of maintenance of the brake caliper are prevented from being impaired. According to the second aspect, the height of the sensor body is increased for easily avoiding a probability of hitting the ground and for contributing to an improvement of ease of assembly and ease of maintenance of the sensor body.

According to the third aspect, the sensor body is mounted in the vicinity of an axle supporting portion of the front fork, so that the mounting accuracy of the sensor body is improved.

According to the fourth aspect, when the sensor body is arranged in the vicinity of the axle as well, the sensor body may be covered with a downward extending portion of the front fender.

According to the fifth aspect, exposure of the sensor body is further suppressed to reduce the disadvantageous influence on the design, and disturbance is prevented from reaching from the outside and the front to the sensor body.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
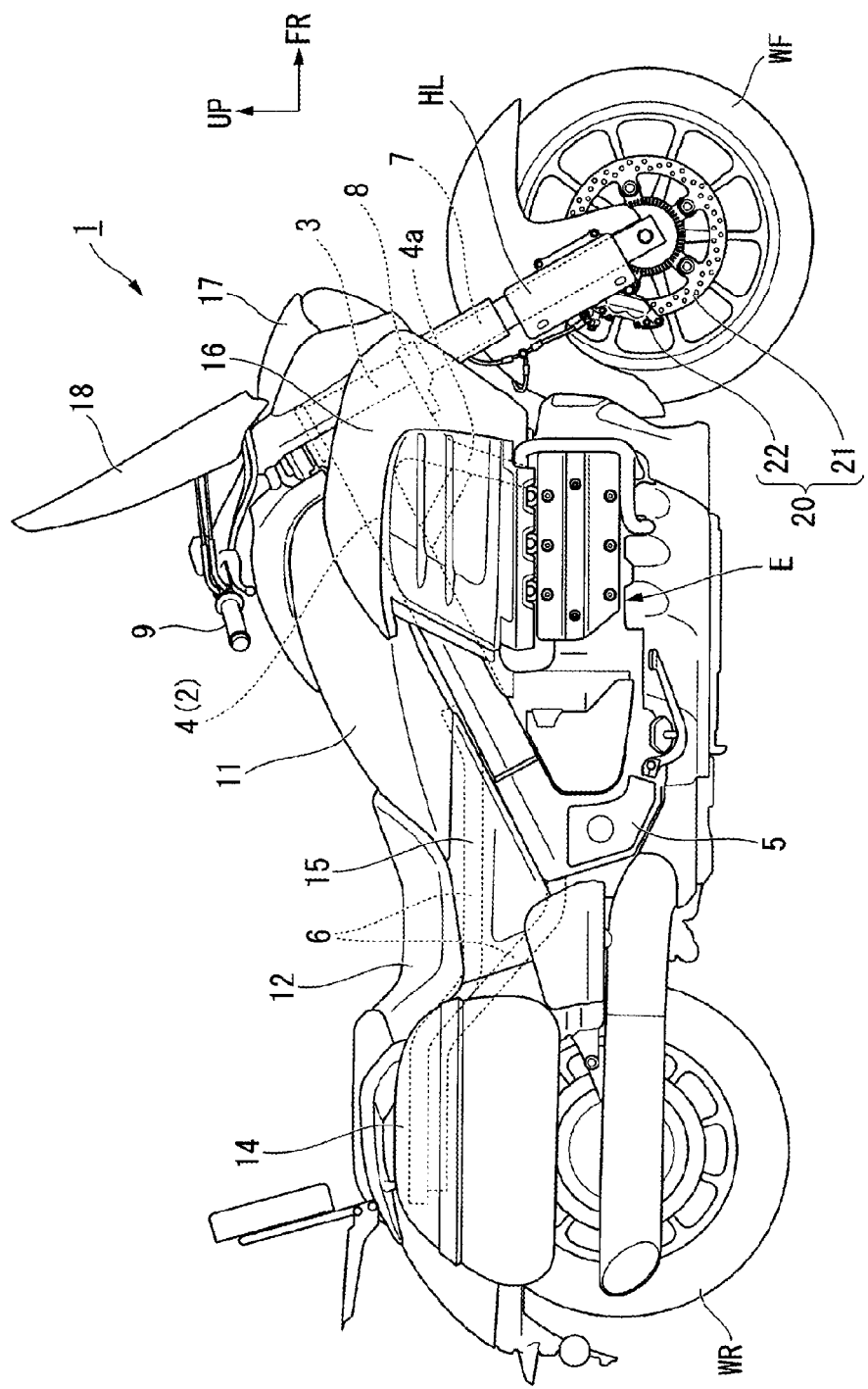
FIG. 1 is a right side view of a motorcycle in an embodiment.

Hereinafter, the embodiments of the invention will be described with reference to the drawings. The directions of front, rear, left and right are the same as directions of a vehicle described below unless otherwise specifically noted. An arrow FR that indicates the front of the vehicle, an arrow LH that indicates the left of the vehicle, and an arrow UP indicating the upward of the vehicle are illustrated at appropriate positions in the drawings used in the description below.

In the motorcycle 1 illustrated in FIG. 1, the front wheel WF is rotatably supported at lower end portions of a pair of the upright left and right front forks 7, and upper portions of the left and right front forks 7 are pivotably supported by the head pipe 3 at a front end portion of a vehicle body frame 2 via a steering stem 8. A bar handle 9 for front wheel steering is mounted to a top bridge of the steering stem 8.

A pair of left and right main frames 4 extend from the head pipe 3, and upper end portions of a pair of left and right pivot frames 5 continue to rear end portions of the left and right main frames 4. A water-cooled four-stroke horizontal opposed six-cylinder engine E, which is a power engine of the motorcycle 1, is mounted below the left and right main frames 4 and in front of the left and right pivot frames 5. Reference sign 4a in the drawing denotes an engine hanger extending downward from the front end portions of the left and right main frames 4, and supporting a front end portion of the engine E.

The left and right pivot frames 5 rotatably support a front end portions of a swing arm (which is not illustrated) configured to support the axis of the rear wheel WR at rear end portions thereof so as to be pivotable in the vertical direction. The swing arm is configured to allow insertion of a drive shaft (which is not illustrated) extending from, for example, the engine E so as to penetrate therethrough, and to be capable of transmitting power between the engine E and the rear wheel WR through the drive shaft.

Front end portions of a rear frame 6 configured to support a seat 12 for a passenger to be seated is connected to rear portions of the left and right main frames 4 and the left and right pivot frames 5. A tank cover 11 as an exterior component is arranged in front of the seat 12. A fuel tank (which is not illustrated) extending into the back of the tank cover 11 is arranged below the front portion of the seat 12. An air cleaner (which is not illustrated) for filtering intake air of the engine E is arranged in the front portion of the tank cover 11 in front of the fuel tank.

Left and right saddle bags 14 are arranged on both sides below the rear portion of the seat 12. Left and right side covers 15 are arranged on both sides below the front portion of the seat 12. Left and right front side covers 16 extending forward until being overlapped with the front forks 7 in side view are arranged on both sides below the front portion of the tank cover 11. A thick plate-shaped radiator (which is not illustrated) that extends substantially orthogonal to the lateral direction (vehicle width direction) is arranged on the inside of the left and right front side covers 16. A lamp cowl 17 configured to cover the periphery of a headlamp or the like and a windscreen 18 that extends upright in front of the operator are supported by the steering stem 8. A license plate holder HL is supported on the outside of the right front fork 7.

Figure 2:
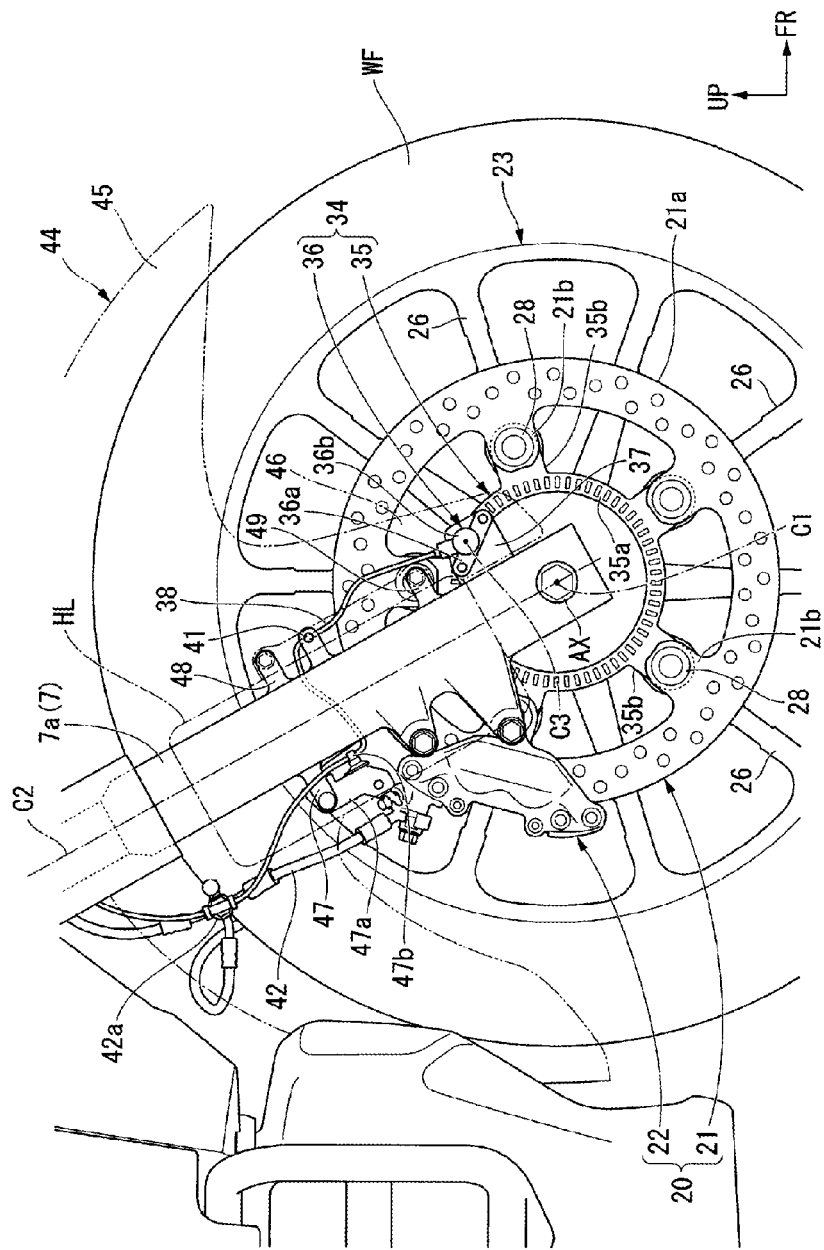
FIG. 2 is a right side view of a portion around a front wheel of the motorcycle.

Referring also to FIG. 2, a pair of left and right brake disks 21 are supported on both left and right sides of the wheel 23 of the front wheel WF so as to rotate integrally. A pair of brake calipers 22 configured to clamp the left and right brake disks 21 are fixedly supported on the rear side of a lower portions of the left and right front forks 7. The left and right brake disks 21 and the left and right brake calipers 22 constitute a pair of left and right front brakes 20.

The brake disks 21 each includes a ring-shaped disk body 21a formed into a disc shape opening at a center portion thereof and clamped by the brake caliper 22 and a plurality of supported strips 21b protruding on an inner peripheral surface of the disk body 21a. The plurality of supported strips 21b are fastened to boss portions 27 projecting form a plurality of spoke portions 26 of the wheel 23 with bolts 28, respectively. Accordingly, the brake disks 21 are mounted directly on the wheel 23.

The brake caliper 22 is, for example, an opposed piston type four pot caliper, and configured to clamp the brake disk 21 by a braking operation that applies a brake to the rotation of the front wheel WF. A floating configuration in which the brake calipers 22 are supported by the front forks 7 so as to be capable of sliding in the vehicle width direction is also applicable.

Figure 3:
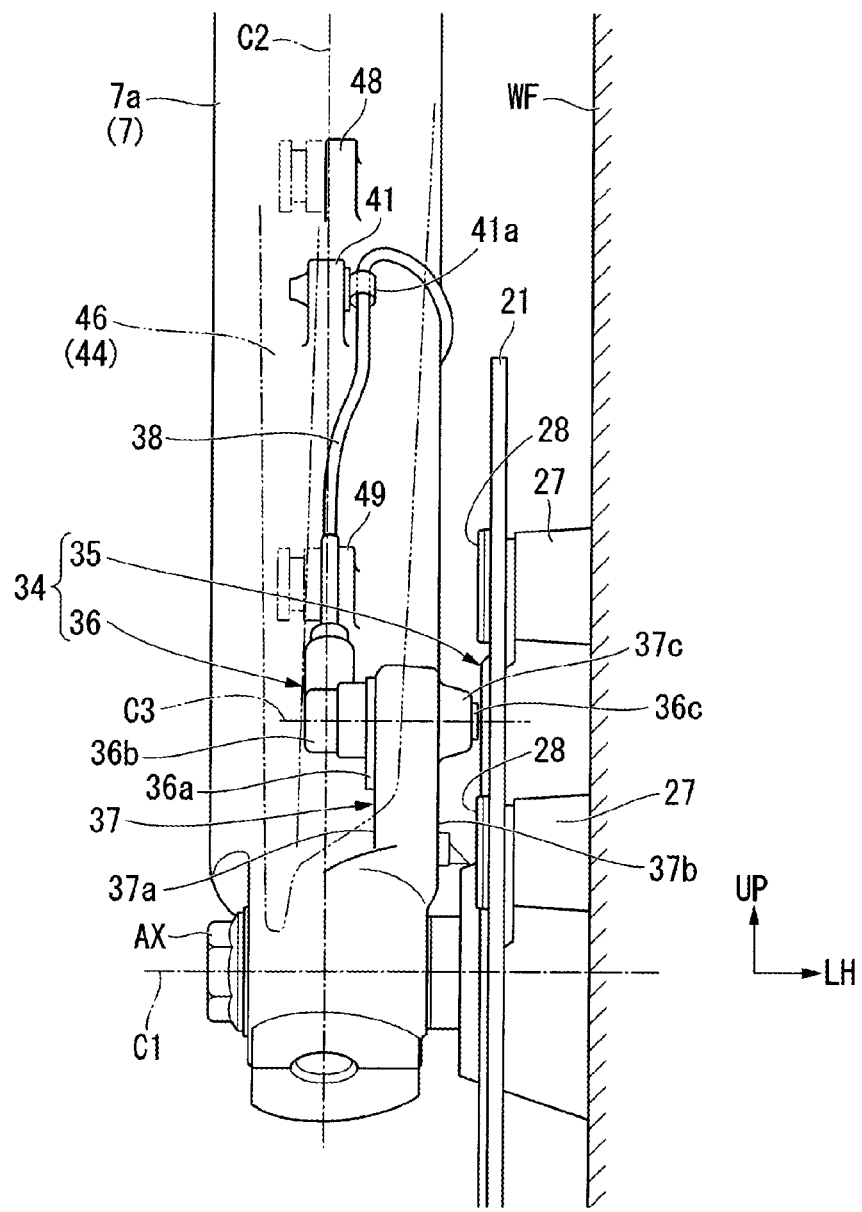
FIG. 3 is a front view of a right side of the front wheel.
Figure 4:
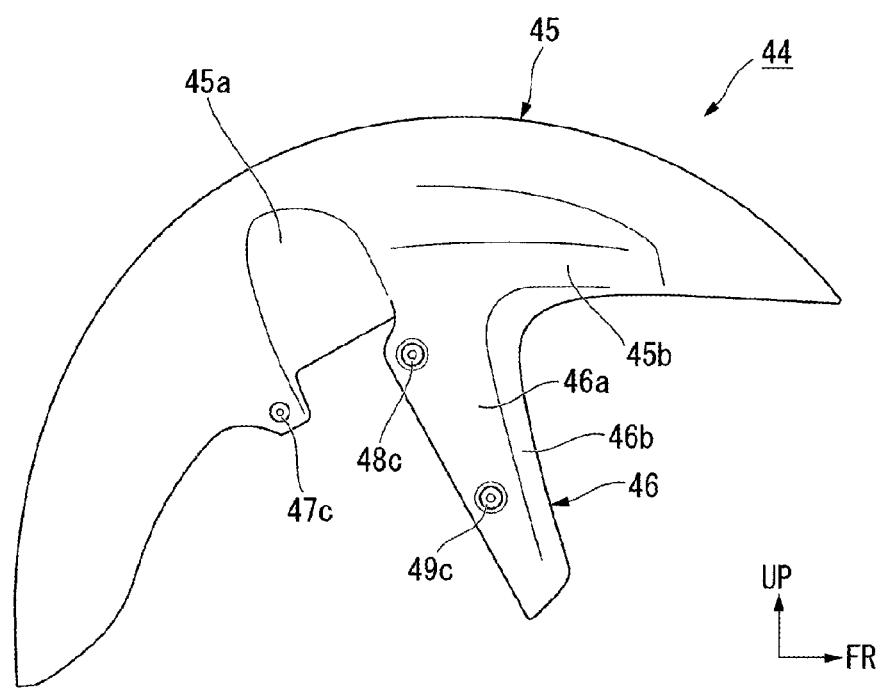
FIG. 4 is a right side view of a front fender of the motorcycle.
Figure 5:
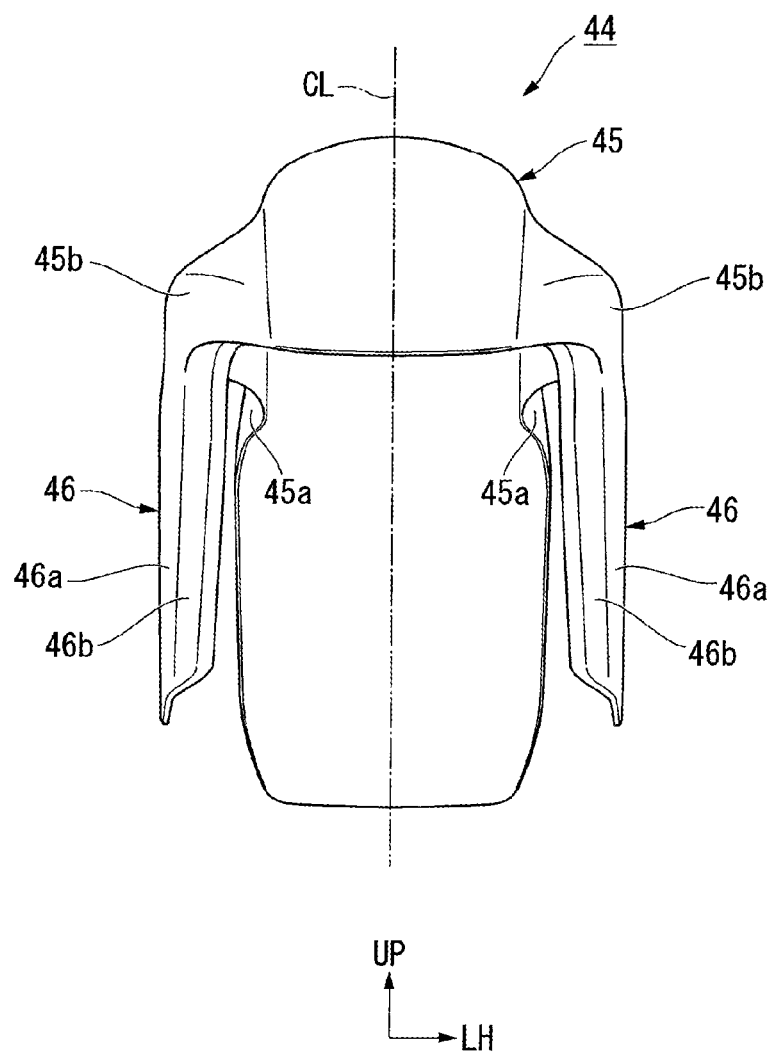
FIG. 5 is a front view of the front fender.
Figure 6:
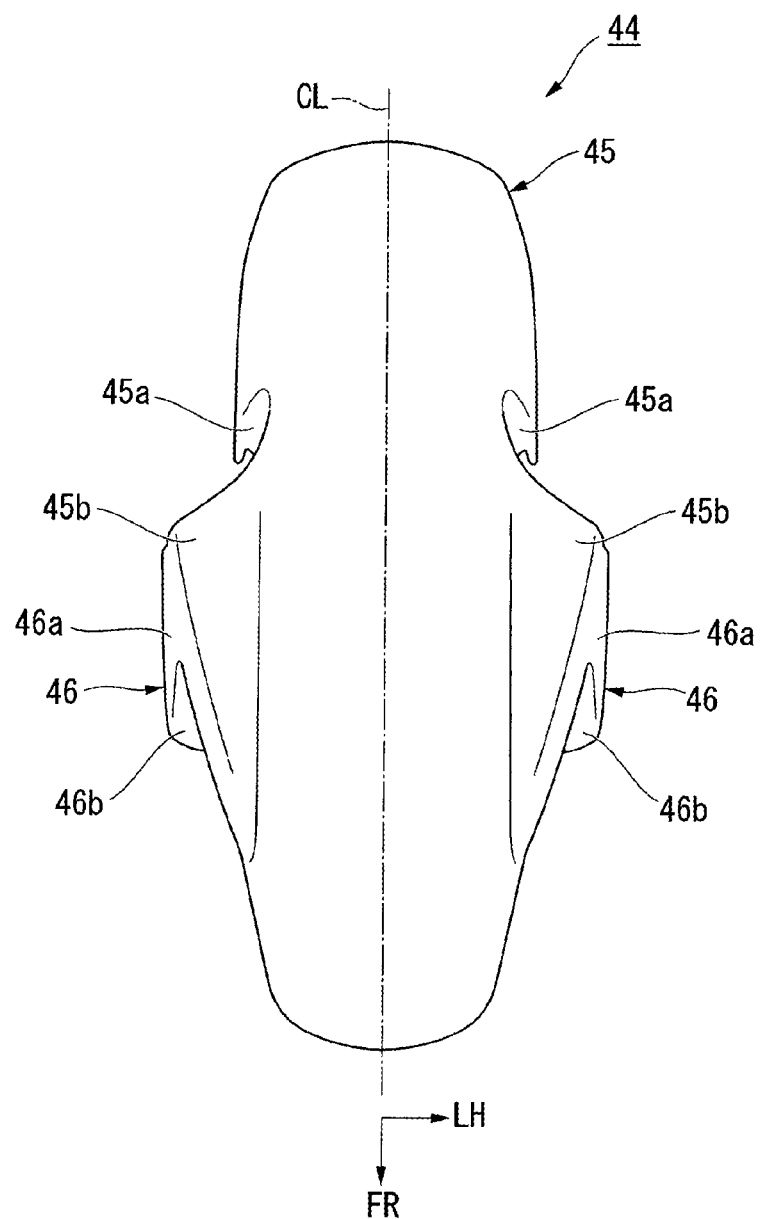
FIG. 6 is a top view of the front fender.

Referring to FIG. 2 and FIG. 3, a wheel speed sensor 34 used, for example, for ABS (Antilock Brake System), traction control, or the like is provided on the right side of the front wheel WF. The wheel speed sensor 34 includes a pulsar ring 35 to be mounted on the wheel 23 of the front wheel WF, and a sensor body 36 to be mounted in front of the lower portion of the right front fork 7.

The pulsar ring 35 is mounted on the wheel 23 of the front wheel WF by fastening together with the brake disks 21 on the inner side of the brake disk 21. The pulsar ring 35 integrally includes a ring-shaped portion-to-be-detected 35a configured to rotate together with the front wheel WF arranged in the proximity to the sensor body 36 on the left side (on the inside in the vehicle width direction) thereof, and a plurality of supported strips 35b protruding on an inner periphery of the portion-to-be-detected 35a corresponding to the plurality of boss portions 27 of the wheel 23. Each of the supported strips 35b is tightened to the boss portion 27 with a bolt 28 together with each of the supported strips 21b of each of the brake disks 21.

The sensor body 36 is arranged so that a center axial line C3 extends along the vehicle width direction. An inner end of the sensor body 36 in the axial direction corresponds to a detecting unit 36c opposing the portion-to-be-detected 35a of the pulsar ring 35. The sensor body 36 outputs a change of a magnetic flux generated by the rotation of the pulsar ring 35 as a pulse signal in accordance with the rotating speed of the front wheel WF, and the output pulse signal is sent to a controller, which is not illustrated, and is used as wheel speed data for controlling the ABS or the traction control system.

A sensor mounting strip 37 for mounting the sensor body 36 is provided on the front fork 7 so as to protrude from the front side and the inside of the lower portion in the vehicle width direction. The sensor mounting strip 37 has a thick plate shape extending substantially orthogonal to the vehicle width direction, and is formed into a rectangular shape in side view. The sensor mounting strip 37 includes a sensor insertion hole that allows insertion of the sensor body 36 and retains the sensor body 36 at a center portion thereof, and includes a front and rear fastening holes configured to fasten the front and rear tightening flanges 36a of the sensor body 36 at the front and the rear of the sensor insertion hole (which are not illustrated). The sensor mounting strip 37 is provided so as to protrude forward from the inside of the front end of the lower portion of an outer tube 7a (bottom case) having a circular shape in cross section in the vehicle width direction, along the direction orthogonal to a center axial line C2 of the outer tube 7a (front fork 7) in side view.

An outer surface 37a of the sensor mounting strip 37 on the outside of the vehicle width direction is positioned on the inside of the center axial line C2 of the outer tube 7a, in the vehicle width direction. An inner surface 37b of the sensor mounting strip 37 on the inside of the vehicle width direction is positioned at the substantially same position in the vehicle width direction as an end edge of the outer tube 7a located on the inside thereof in the vehicle width direction. A protruding portion 37c, which is configured to cause a detecting unit 36c of the sensor body 36 to face the portion-to-be-detected 35a of the pulsar ring 35 positioned on the inside thereof in the vehicle width direction, is formed on an inner surface 37b of the sensor mounting strip 37.

An end cap 36b is mounted on an end portion of the sensor body 36 located on the outside in the vehicle width direction, and a sensor harness 38 is drawn upward from the end cap 36b. The sensor harness 38 extends upward from the end cap 36b, and then is retained by a front supporting protrusion 41 protruding forward from a front end edge of the outer tube 7a via a clip 41a. Subsequently, the sensor harness 38 extends rearward so as to extend along an inner surface of the outer tube 7a, and is retained by a stay 47a supported by a rear upper supporting projection 47 of the outer tube 7a together with a rear portion of the front fender 44 via a clip 47b. Subsequently, the sensor harness 38 extends upward, is supported by a rear upper portion of the front fender 44 together with a clamp portion 42a of the brake hose 42, and is drawn upward together with the brake hose 42. The end cap 36b is arranged within a lateral width of the right front fork 7, in front view. In this embodiment, the end cap 36b is arranged at a position overlapped with the center axial line C2 of the right front fork 7 in front view.

Referring now to FIG. 2 to FIG. 6, the front fender 44 includes a fender body 45 that covers the periphery extending rearward from above the front wheel WF and a lower extending portion 46 extending downward from both ends of the upper portion of the fender body 45 so as to extend along the front end edge of the outer tube 7a, and is formed of a synthetic resin integrally. A line CL in the drawing indicates a center line of the front fender 44 of the lateral direction.

The front fender 44 is secured to a rear upper supporting projection 47 protruding rearward from a rear end position of the outer tube 7a of the left and right front forks 7 above the brake calipers 22, a front-upper supporting protrusion 48 protruding forward from a front end position of the outer tube 7a in front of the rear upper supporting projection 47, and a front lower supporting protrusion 49 protruding forward from below the front-upper supporting protrusion 48 and a front end position of the outer tube 7a respectively so as to be fixedly supported by the outer tube 7a.

Fork bypassing depressions 45a which receive the outer tube 7a are formed on both sides of an upper portion of the fender body 45. The fender body 45 includes side bulged portions 45b on side portions thereof so as to bulge over ranges from the vicinity of the front end thereof to front ends of the side bulged portions 45b so as to protrude sideward in the vehicle width direction more as it goes backward. Downward extending portions 46 extending downward along the front ends of the front forks 7 are formed below the side bulged portions 45b.

The downward extending portions 46 each include a side wall portion 46a that forms an outer surface on the outside in the vehicle width direction, and a front wall portion 46b extending forward and inward in the vehicle width direction from a front end edge of the side wall portion 46a. Upper and lower tightened portions 48c, 49c for the front-upper supporting protrusion 48 of the outer tube 7a and the front lower supporting protrusion 49 are provided on an upper portion and a lower portion of the side wall portion 46a. A rear upper supporting projection 47 for the rear upper supporting projection 47 of the outer tube 7a is provided on the back side of the fork bypassing depression 45a.

Lower end portions of the downward extending portions 46 overlap with the front axle AX in the vertical direction. The sensor mounting strip 37 is positioned below the front lower supporting protrusion 49 of the outer tube 7a, and an area of the sensor mounting strip 37 on the outside from an intermediate portion in the vehicle width direction in the thickness direction (vehicle width direction) of the sensor mounting strip 37 is covered with a lower portion of the downward extending portion 46 from the front and the outside. Accordingly, an influence of the disturbance on the outer portion of the sensor body 36 protruding to the outside of the sensor mounting strip 37 in the vehicle width direction and a portion of the sensor harness 38 extending from the outside of the sensor body 36 laid in front of the outer tube 7a is suppressed.

As described thus far, in the saddle-type vehicle including the front forks 7 configured to rotatably support the front wheel WF, the front fender 44 configured to cover the upper portion of the front wheel WF, the brake calipers 22 configured to be supported by the rear sides of the front forks 7, and the wheel speed sensor 34 provided between the front wheel WF and the front fork 7, the motorcycle 1 is configured in such a manner that the wheel speed sensor 34 includes the sensor body 36 to be supported in front of the front fork 7, the front fender 44 includes the downward extending portions 46 extending downward along the front side of the front forks 7, and the downward extending portion 46 covers the sensor body 36.

In this configuration, since the exposure of the sensor body 36 to the appearance is suppressed, the influence of the arrangement of the sensor body 36 on the design is suppressed. Since the brake calipers 22 and the sensor body 36 are arranged on the front and the rear of the front fork 7, mutual impairment of the operations at the time of assembly or maintenance of the sensor body 36 and at the time of maintenance of the brake calipers 22 is suppressed.

In the motorcycle 1, since the sensor body 36 is arranged above the axle (front axle AX) of the front wheel WF, the height of the sensor body 36 is increased for easily avoiding a probability of hitting the ground and for contributing to an improvement of ease of assembly and ease of maintenance of the sensor body 36.

In the motorcycle 1, since the front fork 7 includes a mounting portion (sensor mounting strip 37) of the sensor body 36 in the vicinity of the axle of the front wheel WF, the sensor body 36 is mounted in the vicinity of the axle supporting portion of the front fork 7, so that the mounting accuracy of the sensor body 36 is improved.

In the motorcycle 1, since the downward extending portions 46 of the front fender 44 extend downward so as to be overlapped with the axle of the front wheel WF in the vertical direction, the sensor body may be covered with the downward extending portion 46 of the front fender 44 even when the sensor body 36 is arranged in the vicinity of the axle.

In the motorcycle 1, since the downward extending portions 46 of the front fender 44 each include the side wall portion 46a configured to cover the sensor body 36 from the outside and the front wall portion 46b configured to cover the sensor body 36 from the front, exposure of the sensor body 36 is further suppressed to reduce the disadvantageous influence on the design, and disturbance is prevented from reaching from the outside and the front to the sensor body 36.

The invention is not limited to the embodiment described above and, for example, the saddle-type vehicle includes general vehicles on which an operator rides by straddling a vehicle body, and includes not only motorcycles (including motorized two-wheeled vehicles and scooter-type vehicles), but also three-wheeled (in addition to vehicles with one front wheel and two rear wheels, vehicles with two front wheel and one rear wheel are included) or four-wheeled vehicles.

The configuration of the above-described embodiment is an example of the invention only, and various modifications may be made without departing from the scope of the invention by replacing components of the embodiment by known components.

I claim:

1. A saddle-type vehicle, comprising:
a front fork rotatably supporting a wheel;
a front fender covering an upper portion of said wheel;

a brake caliper supported on a rear side of said front fork; and a wheel speed sensor provided between said wheel and said front fork, wherein said wheel speed sensor includes a sensor body supported on a front side of said front fork, wherein said front fender includes a downward extending portion extending downward along said front side of said front fork, wherein said downward extending portion covers said sensor body, and wherein said wheel speed sensor is mounted in a sensor mounting strip which protrudes from a front side of said front fork, said sensor mounting strip being integral with said front fork.

2. The saddle-type vehicle according to claim 1, wherein said sensor body is disposed above an axle of said wheel.

3. The saddle-type vehicle according to claim 1, wherein said front fork includes a mounting portion for mounting said sensor body, in the vicinity of an axle of said wheel.

4. The saddle-type vehicle according to claim 2, wherein said front fork includes a mounting portion for mounting said sensor body, in the vicinity of said axle of said wheel.

5. The saddle-type vehicle according to claim 1, wherein said downward extending portion of said front fender extends downward so as to overlap an axle of said wheel, in a vertical direction.

6. The saddle-type vehicle according to claim 2, wherein said downward extending portion of said front fender extends downward so as to overlap said axle of said wheel, in a vertical direction.

7. The saddle-type vehicle according to claim 3, wherein said downward extending portion of said front fender extends downward so as to overlap said axle of said wheel, in a vertical direction.

8. The saddle-type vehicle according to claim 4, wherein said downward extending portion of said front fender extends downward so as to overlap said axle of said wheel, in a vertical direction.

9. The saddle-type vehicle according to claim 1, wherein said downward extending portion of said front fender includes a side wall portion covering said sensor body from a side direction, and a front wall portion covering said sensor body from a front direction.

10. The saddle-type vehicle according to claim 2, wherein said downward extending portion of said front fender includes a side wall portion covering said sensor body from a side direction, and a front wall portion covering said sensor body from a front direction.

11. The saddle-type vehicle according to claim 3, wherein said downward extending portion of said front fender includes a side wall portion covering said sensor body from a side direction, and a front wall portion covering said sensor body from a front direction.

12. The saddle-type vehicle according to claim 4, wherein said downward extending portion of said front fender includes a side wall portion covering said sensor body from a side direction, and a front wall portion covering said sensor body from a front direction.

13. The saddle-type vehicle according to claim 5, wherein said downward extending portion of said front fender includes a side wall portion covering said sensor body from a side direction, and a front wall portion covering said sensor body from a front direction.

14. The saddle-type vehicle according to claim 6, wherein said downward extending portion of said front fender includes a side wall portion covering said sensor body from a side direction, and a front wall portion covering said sensor body from a front direction.

15. The saddle-type vehicle according to claim 7, wherein said downward extending portion of said front fender includes a side wall portion covering said sensor body from a side direction, and a front wall portion covering said sensor body from a front direction.

16. The saddle-type vehicle according to claim 8, wherein said downward extending portion of said front fender includes a side wall portion covering said sensor body from a side direction, and a front wall portion covering said sensor body from a front direction.

* * * * *